US009350569B2

(12) United States Patent
Jiang et al.

(10) Patent No.: US 9,350,569 B2
(45) Date of Patent: May 24, 2016

(54) METHOD AND APPARATUS FOR RECONSTRUCTING DATA

(71) Applicant: HUAWEI TECHNOLOGIES CO., LTD., Shenzhen, Guangdong (CN)

(72) Inventors: Na Jiang, Shanghai (CN); Yanbin Jiang, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/164,675

(22) Filed: Jan. 27, 2014

(65) Prior Publication Data
US 2014/0140383 A1 May 22, 2014

Related U.S. Application Data

(63) Continuation of application No. PCT/CN2012/079136, filed on Jul. 25, 2012.

(30) Foreign Application Priority Data

Jul. 25, 2011 (CN) .......................... 2011 1 0209714

(51) Int. Cl.
*H03D 1/00* (2006.01)
*H04L 25/02* (2006.01)
*H04L 1/06* (2006.01)

(52) U.S. Cl.
CPC ........ *H04L 25/0202* (2013.01); *H04L 25/0212* (2013.01); *H04L 25/0224* (2013.01); *H04L 1/06* (2013.01)

(58) Field of Classification Search
CPC ... H04L 1/06; H04L 25/0202; H04L 25/0212; H04L 1/00; H04L 25/02
USPC .......................................... 375/316, 324, 343
See application file for complete search history.

(56) References Cited

U.S. PATENT DOCUMENTS

2004/0196929 A1* 10/2004 Wendt et al. ................... 375/340
2005/0025267 A1   2/2005 Reznik et al.
(Continued)

FOREIGN PATENT DOCUMENTS

CN   1387335 A   12/2002
CN   1983839 A   6/2007
(Continued)

OTHER PUBLICATIONS

International Search Report issued Jan. 11, 2012, in corresponding International Patent Application No. PCT/CN2012/079136.
(Continued)

*Primary Examiner* — Freshteh N Aghdam
(74) *Attorney, Agent, or Firm* — Staas & Halsey LLP

(57) ABSTRACT

Embodiments of the present invention provide a method and an apparatus for reconstructing data. The method includes: acquiring a self-correlation function of a root raised cosine filter coefficient and a fading factor of each antenna of channel estimation; constructing an L-dimension matrix of the self-correlation function according to the antenna; processing a result of superposing the L-dimension matrix of the self-correlation function and the fading factor of each antenna to obtain an estimate value of an actual fading factor of the each antenna; and reconstructing received data according to the estimate value of the actual fading factor to obtain reconstructed data used for cancellation. In the embodiments of the present invention, a process of performing interference cancellation for data reconstruction is closer to an actual sending process and closer to an originally sent signal, thereby improving cancellation efficiency and reducing interference.

11 Claims, 4 Drawing Sheets

(56) References Cited

U.S. PATENT DOCUMENTS

2006/0221809 A1* 10/2006 Malladi et al. ............... 370/206
2010/0054355 A1   3/2010 Kinjo et al. ................... 375/262

FOREIGN PATENT DOCUMENTS

| CN | 101277127 A | 10/2008 |
| CN | 101895311 A | 11/2010 |
| CN | 102098083 A | 6/2011 |
| CN | 102271025 A | 12/2011 |
| EP | 1158716 | 11/2001 |
| JP | 2010-62944 | 3/2010 |

OTHER PUBLICATIONS

Chinese Office Action issued Jan. 30, 2013, in corresponding Chinese Patent Application No. 201110209714.X.
Extended European Search Report dated Jun. 5, 2014 in corresponding European Patent Application No. 12816839.0.
International Search Report, dated Nov. 1, 2012, in corresponding International Application No. PCT/CN2012/079136 (6 pp.).

* cited by examiner

METHOD AND APPARATUS FOR RECONSTRUCTING DATA

CROSS-REFERENCE TO RELATED APPLICATION

This application is a continuation of International Application No. PCT/CN2012/079136, filed on 25 Jul. 2012, which claims priority to Chinese Patent Application No. 201110209714.X, filed on 25 Jul. 2011, both of which are hereby incorporated by reference in their entireties.

TECHNICAL FIELD

Embodiments of the present invention relate to the field of communications technologies, and in particular, to a method and an apparatus for reconstructing data.

BACKGROUND

With rapid development of communications technologies, an interference cancellation (IC, Interference Cancellation) technology is introduced to improve an uplink data transmission rate. This technology reconstructs a received signal according to an estimate value of a user and is used to cancel a signal that interferes with a user, so as to improve a demodulated signal-to-interference-plus-noise ratio, thereby improving performance of a target user. The interference cancellation technology reduces uplink interference to obtain performance improvement by cancelling Dedicated Physical Data Channel (DPDCH, Dedicated Physical Data Channel) data, Dedicated Physical Control Channel (DPCCH, Dedicated Physical Control Channel) data, Enhanced Dedicated Physical Control Channel (EDPCCH) data, and Enhanced Dedicated Physical Data Channel (EDPDCH) data of each user in baseband data. Reconstruction is one of important steps of interference cancellation, and the quality of reconstruction directly determines cancellation efficiency of interference cancellation and system performance. One of important steps of baseband data reconstruction, however, is to add fading to a signal. Generally, a fading factor obtained by channel estimation is used during the adding of fading and is not an actual fading factor. For a process of baseband data reconstruction that is a process of simulating signal transmission, an actual fading factor is needed. A fading factor obtained by actual estimation, however, is affected by root raised cosine filters at a transmit end and a receive end, and is a result of superposing fading factors of all valid paths and not the actual fading factor.

For example, it is assumed that a channel fading factor is $h_l$ is an actual fading factor of each valid path, while a fading factor $h'_l$ obtained by actual estimation is a result of superposing fading factors of all valid paths because the fading factor $h'_l$ is affected by a root raised cosine filter at a receive end, that is, $h'_l$ obtained by estimation is as follows:

$$h'_l = \sum_{q=0}^{L-1} h_q R_p(\tau_l - \tau_q), l = 0, 1, \ldots, L-1 \quad (1.)$$

During data reconstruction for IC, a process of data passing through a channel is simulated before data is received, and an impact of the channel on the data is simulated by using an estimated fading factor, and then the data is obtained after being processed twice by a root raised cosine filter (or once by a raised cosine filter). What is obtained through the channel estimation is a channel fading factor that includes an impact of a filter, that is, convolutions of the actual fading factor and $R_p$. When channel data is reconstructed for interference cancellation, a fading factor obtained by the channel estimation is used.

During research and practice of the prior art, the inventor of the present invention finds that, in an existing implementation manner, a fading factor obtained by channel estimation is not an actual channel fading factor, and reconstructed data largely deviates from data actually sent on a channel, thereby affecting a gain of interference cancellation and reducing efficiency of the cancellation.

SUMMARY

Embodiments of the present invention provide a method and an apparatus for reconstructing data, so as to solve a technical problem that data reconstruction does not follow an actual sending process.

To solve the technical problem described above, one aspect of the present invention provides a method for reconstructing data, including:

acquiring, by the receive end, a self-correlation function of a root raised cosine filter coefficient and a fading factor of each antenna of channel estimation;

constructing, by the receive end, an L-dimension matrix of the self-correlation function according to the antenna, where L is the number of valid paths found by the single antenna;

processing, by the receive end, a result of superposing the L-dimension matrix of the self-correlation function and the fading factor of each antenna to obtain an estimate value of an actual fading factor of the each antenna; and reconstructing, by the receive end, received data according to the estimate value of the actual fading factor to obtain reconstructed data used for cancellation.

According to another aspect, the present invention further provides an apparatus for reconstructing data, including:

an acquiring unit, configured to acquire a self-correlation function of a root raised cosine filter coefficient and a fading factor of each antenna of channel estimation;

a constructing unit, configured to construct an L-dimension matrix of the self-correlation function according to the antenna, where L is the number of valid paths found by the single antenna;

a processing unit, configured to process a result of superposing the L-dimension matrix of the self-correlation function constructed by the constructing unit and the fading factor of each antenna acquired by the acquiring unit to obtain an estimate value of an actual fading factor of the each antenna; and a reconstructing unit, configured to reconstruct received data according to the estimate value of the actual fading factor obtained by the processing unit to obtain reconstructed data used for cancellation.

As can be seen from the above disclosed technical solutions, in the embodiments of the present invention, when interference cancellation is performed for reconstructed data, an estimate value of an actual fading factor is used to reconstruct received data, so that a process of performing the interference cancellation for the reconstructed data is closer to an actual sending process and closer to an originally sent signal, thereby improving cancellation efficiency and reducing interference.

BRIEF DESCRIPTION OF DRAWINGS

To describe the technical solutions in the embodiments of the present invention more clearly, the following briefly introduces the accompanying drawings required for describing the embodiments.

DESCRIPTION OF EMBODIMENTS

To help a person skilled in the art better understand the technical solutions in the embodiments of the present invention, the following further describes the embodiments of the present invention in detail with reference to the accompanying drawings and implementation manners.

Figure 1:
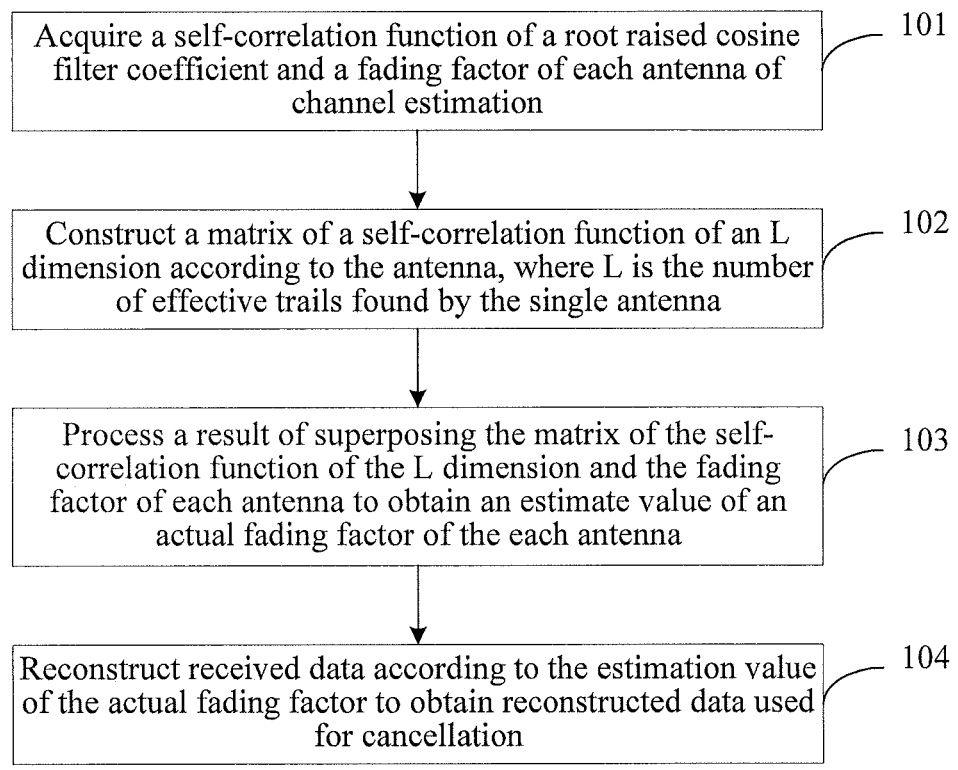
FIG. 1 is a flowchart of a method for reconstructing data according to an embodiment of the present invention.

Refer to FIG. 1, which is a flowchart of a method for reconstructing data according to an embodiment of the present invention. The method includes:

Step 101: Acquire a self-correlation function of a root raised cosine filter coefficient and a fading factor of each antenna of channel estimation.

In this embodiment, a root raised cosine filter at a receive end is preset, that is, once the root raised cosine filter at the receive end is determined, a self-correlation function of the root raised cosine filter at the receive end is determined, and therefore $R_p$ is determined.

For acquiring the fading factor of each antenna of channel estimation, in this embodiment, a pilot is used by the receive end to perform channel estimation and obtain an estimated fading factor of each antenna, and the channel fading factors obtained by the channel estimation reflect channel information (including an amplitude and a phase). For a person skilled in the art, this process is already a well-known technology, and therefore no further details are provided herein.

Step 102: Construct an L-dimension matrix of the self-correlation function according to an antenna, where L is the number of valid paths found by the single antenna.

Step 103: Process a result of superposing the L-dimension matrix of the self-correlation function and the fading factor of each antenna to obtain an estimate value of an actual fading factor of the each antenna.

In this embodiment, a solving operation may be performed on the result of superposing the matrix of the self-correlation function and the fading factor of each antenna to obtain the estimate value of the actual fading factor of each antenna. The solving operation may specifically be performed according to a method of solving a set of linear equations but is not limited to this, and another algorithm may also be used for the obtaining, which is not limited in this embodiment.

Step 104: Reconstruct received data according to the estimate value of the actual fading factor to obtain reconstructed data used for cancellation, which is close to actual sent data.

The reconstructed data is used for interference cancellation, and the reconstructing data is adding fading to the received data.

Further, before step 101, the method may further include: reordering locations of the paths and locations of the fading factors according to an antenna number, so that the paths and the fading factors are separately arranged according to different antennas.

Further, based on all the foregoing embodiments, the processing a result of superposing the L-dimension matrix of the self-correlation function and the fading factor of each antenna to obtain an estimate value of an actual fading factor of each antenna includes: performing inversion on the L-dimension matrix of the self-correlation function to obtain an L-dimension inverse matrix of the self-correlation function; performing deconvolution processing on the result of superposing the fading factor of each antenna and the L-dimension inverse matrix of the self-correlation function to obtain the estimate value of the actual fading factor of each antenna; and then reconstructing the received data according to the estimate values of the actual fading factors to obtain actual sent data.

The performing inversion on the L-dimension matrix of the self-correlation function specifically includes: performing inversion on the L-dimension matrix of the self-correlation function according to a successive over relaxation method (SOR, Successive Over Relaxation Method) or a decomposition method. This, however, is not a limitation, and another method may also be used, which is not limited in this embodiment.

In the embodiment of the present invention, a pilot is used at the receive end to perform channel estimation, and the channel fading factors obtained by the channel estimation reflect channel information (an amplitude and a phase). For ease of understanding, a signal received by an antenna may be expressed as Y=HX+N, and deriving a fading factor H is using the pilot, that is, a known X (a transmitted pilot value is a known quantity) and Y (a received pilot value), to derive H. H can be used for all channels with simultaneous transmission, including a data channel. Solving a data signal is an inverse process, that is, deriving X from a known H and Y. During the reconstruction, an estimate value Y' of Y is derived according to an estimate value X' of the transmitted data and H.

That is to say, in the embodiment of the present invention, at the receive end, in order to remove influence of the root raised cosine filter, actual fading factors are used for adding the fading during the data reconstruction. The actual fading factors are obtained through deconvolution of the fading factors obtained by channel estimation and the self-correlation function $R_p$. In order to obtain the actual fading factors, deconvolution processing needs to be performed, specifically including the following:

It is assumed that a relationship between an actual fading factor $h_j$ of each valid path and the fading factor $h'_j$ obtained by the channel estimation is as follows:

$$h_j = \sum_{l=0}^{L-1} h'_l R_{pp}^{-1}(j, l) \qquad (2.)$$

where $R_p$ is the self-correlation function of the root raised cosine filter at the receive end, and $R_p$ is determined once the root raised cosine filter is determined; $R_{pp}$ is a coefficient matrix formed by all $R_p$ is in the formula (1); $R_{pp}^{-1}$ is an inverse matrix of $R_{pp}$; and the matrix $R_{pp}$ is as follows:

$$R_{pp} = \begin{bmatrix} R_p(\tau_0 - \tau_0) & R_p(\tau_0 - \tau_1) & \ldots & R_p(\tau_0 - \tau_{L-1}) \\ R_p(\tau_1 - \tau_0) & R_p(\tau_1 - \tau_1) & \ldots & R_p(\tau_1 - \tau_{L-1}) \\ \vdots & \vdots & \ddots & \vdots \\ R_p(\tau_{L-1} - \tau_0) & R_p(\tau_{L-1} - \tau_1) & \ldots & R_p(\tau_{L-1} - \tau_{L-1}) \end{bmatrix}$$

Then the reverse matrix $R_{pp}^{-1}$ of the matrix $R_{pp}$ is solved. For a person skilled in the art, this process is already a well-known technology, and therefore no further details are provided herein.

Further, the actual fading factor $h_j$ can be obtained by substituting $h'_j$ and $R_{pp}^{-1}$ in the formula $$h_j = \sum_{l=0}^{L-1} h'_l R_{pp}^{-1}(j, l).$$

Certainly, the determining the actual fading factor $h_j$ may be implemented by using another method, such as a linear solving method, that is, solving a set of linear equations $$h'_l = \sum_{q=0}^{L-1} h_q R_p(\tau_l - \tau_q), l = 0, 1, \ldots, L-1.$$

Then the estimate value of the actual fading factor of each antenna can be obtained. For details, refer to the following embodiments.

In the embodiment of the present invention, when interference cancellation is performed for reconstructed data, an estimate value of an actual fading factor is used to reconstruct received data, so that a process of performing the interference cancellation for the reconstructed data is closer to an actual sending process and closer to an originally sent signal, thereby improving cancellation efficiency and reducing interference. In addition, a signal-to-interference-plus-noise ratio of a user is improved during demodulation and performance is improved; and cell capacity is improved and more users are accessed on a precondition of ensuing that user performance does not change.

In the embodiment of the present invention, after data is received by a receiver, one channel of the data experiences parameter estimation, such as estimation of a path or a fading factor, and an obtained estimation result is used as input of the reconstruction; another channel of data experiences demodulation to obtain information of a transmit end (that is, reconstructed soft information), and the reconstructed soft information is also used as input of the reconstruction; then, reconstruction processing is performed according to the two channels of input to obtain reconstruction of the actual fading factor; and finally, fading is added to the received data by using the actual fading factor to obtain reconstructed data used for cancellation.

Figure 2:
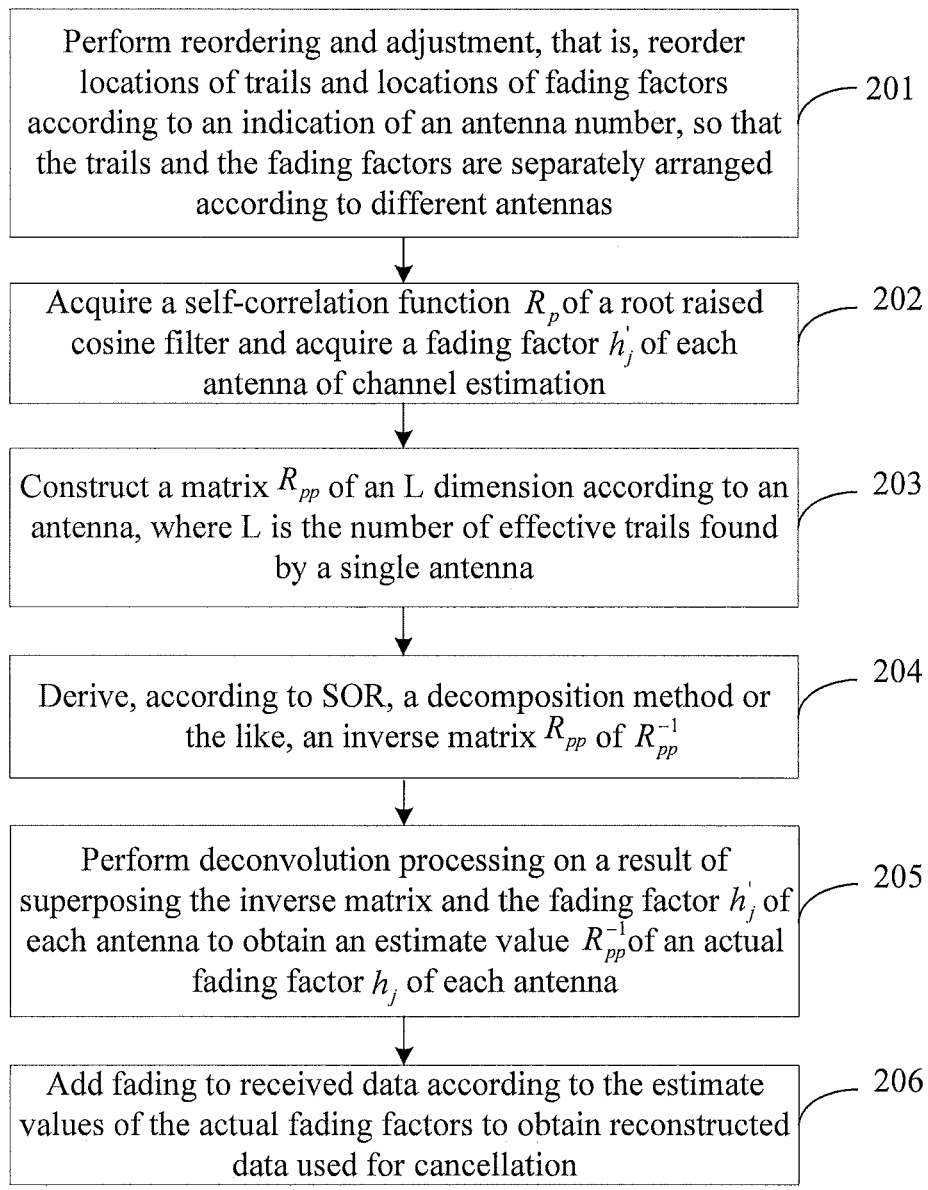
FIG. 2 is a flowchart of a first application example of a method for reconstructing data according to an embodiment of the present invention.
Figure 3:
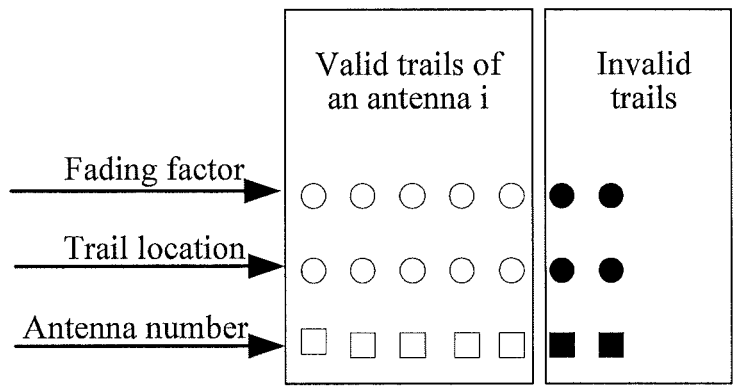
FIG. 3 is a pareto diagram of locations of fading factors and locations of paths of an $i^{th}$ antenna after the locations of the fading factors and the locations of the paths are adjusted according to antenna numbers according to an embodiment of the present invention.

Refer to FIG. 2, which is a flowchart of a first application example of a method for reconstructing data according to an embodiment of the present invention. In this embodiment, a process of deconvolution processing is used as an example to obtain an estimate value of an actual fading factor of each antenna. The process specifically includes the following steps:

Step 201: Perform reordering and adjustment, that is, reorder locations of paths and locations of fading factors according to an indication of an antenna number, so that the paths and the fading factors are separately arranged according to different antennas, as shown in FIG. 3, which is a pareto diagram of locations of fading factors and locations of paths of an $i^{th}$ antenna after the locations of the fading factors and the locations of the paths are adjusted according to antenna numbers provided in an embodiment of the present invention.

Step 202: Acquire a self-correlation function $R_p$ of a root raised cosine filter, and acquire a fading factor $h'_j$ of each antenna of channel estimation.

$R_p$ may be acquired through a storage table.

Step 203: Construct an L-dimension matrix $R_{pp}$ respectively according to the antenna, where L is the number of valid paths found by the single antenna.

(Using FIG. 3 as an example, there are five valid paths for an antenna i, that is, Ni=L=5.)

It is known that a location of a valid path found by the antenna i is tmpFD[Index[i]], and Ni represents the number of valid paths of the antenna i. $R_{pp}$ is constructed. For an antenna, the matrix is a matrix of at most N*N, where N is the maximum number of paths.

Step 204: Solve an inverse matrix $R_{pp}^{-1}$ of $R_{pp}$ according to methods such as SOR, or a decomposition method.

Step 205: Perform deconvolution processing on a result of superposing the inverse matrix $R_{pp}^{-1}$ and the fading factor of each antenna to obtain an estimate value $h_j$ of an actual fading factor of each antenna.

In this step, a formula $$h_j = \sum_{l=0}^{L-1} h'_l R_{pp}^{-1}(j, l)$$

may be used to derive an actual fading factor of the antenna i after deconvolution processing is performed, that is, the estimated actual fading factor $h_j$.

A process from step 202 to step 205 is performing deconvolution processing on each antenna to obtain the estimate value of the actual fading factor of each antenna.

Similarly, other antennas are similarly processed according to an implementation process from step 202 to step 205, so as to obtain estimated actual fading factors of other antennas.

Step 206: Add fading to received data according to the estimate values of the actual fading factors to obtain reconstructed data used for cancellation.

To help a person skilled in the art understand a process of calculating the estimate value of the actual fading factor of each antenna, the following uses a simple example for description. It should be noted that an implementation process in a practical application is much more complicated than the following implementation process, and the example is used for brief description only.

The following uses processing of an antenna as an example, where the antenna has two valid paths.

It is assumed that Rp(−4)=0, Rp(−3)=−1, Rp(−2)=0, Rp(−1)=1, Rp(0)=5, Rp(1)=1, Rp(2)=0, Rp(3)=−1, and Rp(4)=0; L=2, $\tau_0$=0, and $\tau_1$=3; and h'$_0$=−8 and h'$_1$=16 are obtained accordingly by estimation.

$$R_{pp} = \begin{bmatrix} R_p(0) & R_p(-3) \\ R_p(3) & R_p(0) \end{bmatrix} = \begin{bmatrix} 5 & -1 \\ -1 & 5 \end{bmatrix}$$

is obtained by construction, and $$R_{pp}^{-1} = \begin{bmatrix} \frac{5}{24} & \frac{1}{24} \\ \frac{1}{24} & \frac{5}{24} \end{bmatrix}$$

is acquired.

A formula $$h_j = \sum_{l=0}^{L-1} h'_l R_{pp}^{-1}(j, l)$$

is used to calculate and obtain estimate values of actual fading factors of the antenna:

$$h_0 = h'_0 R_{pp}^{-1}(0,0) + h'_1 R_{pp}^{-1}(0,1) = -8 * 5/24 + 16 * 1/24 = -1,$$
and
$$h_1 = h'_0 R_{pp}^{-1}(1,0) + h'_1 R_{pp}^{-1}(1,1) = -8 * 1/24 + 16 * 5/24 = -3.$$

Figure 4:
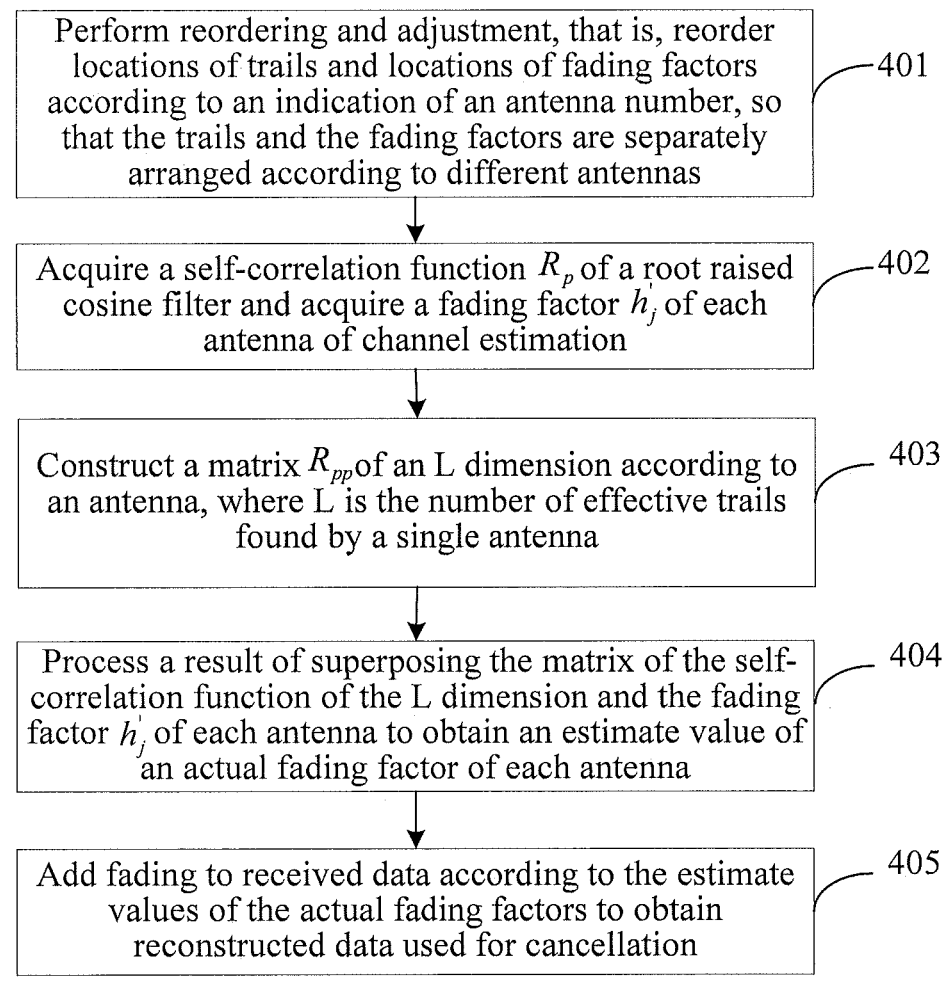
FIG. 4 is a flowchart of a second application example of a method for reconstructing data according to an embodiment of the present invention.

Refer to FIG. 4, which is a flowchart of a second application example of a method for reconstructing data according to an embodiment of the present invention. In this embodiment, a processing procedure of a solving operation is used as an example to obtain an estimate value of an actual fading factor of each antenna. In this embodiment, $h'_j$ and Rp are known, and a value of $h_j$ is estimated. A formula $$h'_l = \sum_{q=0}^{L-1} h_q R_p(\tau_l - \tau_q), l = 0, 1, \ldots, L-1$$

may be regarded as a set of linear equations, and all methods (such as Gaussian elimination) used to solve the set of linear equations may be used to derive the actual fading factor. A specific implementation process includes the following steps:

Step 401: Perform reordering and adjustment, that is, reorder locations of paths and locations of fading factors according to an indication of an antenna number, so that the paths and the fading factors are separately arranged according to different antennas. FIG. 3 shows an $i^{th}$ antenna.

Step 402: Acquire a self-correlation function $R_p$ of a root raised cosine filter and acquire a fading factor $h'_j$ of each antenna of channel estimation.

The self-correlation function $R_p$ may be acquired by using a storage table, that is to say, once the root raised cosine filter is determined, the self-correlation function $R_p$ of the root raised cosine filter is acquired from the corresponding storage table.

Step 403: Construct an L-dimension matrix of the self-correlation function, where L is the number of valid paths found by a single antenna.

Step 404: Perform linear solving on a result of superposing the L-dimension matrix of the self-correlation function and the fading factor $h'_j$ of each antenna to obtain the estimate value of the actual fading factor of each antenna.

In this step, $h_j$ can be obtained by solving a set of linear equations $$h'_l = \sum_{q=0}^{L-1} h_q R_p(\tau_l - \tau_q), l = 0, 1, \ldots, L-1.$$

Specifically, the set of linear equations may be solved according to Gaussian elimination, so that the estimate value of the actual fading factor of each antenna may be obtained.

Similarly, other antennas are similarly processed according to an implementation process from step 402 to step 404, so as to obtain estimated actual fading factors of other antennas.

Step 405: Add fading to received data according to the estimate value of the actual fading factor to obtain reconstructed data used for cancellation.

To help a person skilled in the art understand a process of calculating the estimate value of the actual fading factor of each antenna, the following uses a simple example for description. It should be noted that an implementation process in a practical application is much more complicated than the following implementation process, and the example is used for brief description only.

It is assumed that Rp(−4)=0, Rp(−3)=−1, Rp(−2)=0, Rp(−1)=1, Rp(0)=5, Rp(1)=1, Rp(2)=0, Rp(3)=−1, and Rp(4)=0; L=2, $\tau_0$=0, and $\tau_1$=3; and h'$_0$=−8 and h'$_1$=16 are obtained accordingly by estimation.

The set of linear equations are as follows:

$$\begin{cases} h'_0 = \sum_{q=0}^{L-1} h_q R_p(\tau_0 - \tau_q) = 5h_0 - h_1 \\ h'_1 = \sum_{q=0}^{L-1} h_q R_p(\tau_1 - \tau_q) = -h_0 + 5h_1. \end{cases}$$

That is:

$$\begin{cases} 5h_0 - h_1 = -8 \\ -h_0 + 5h_1 = 16. \end{cases}$$

The following is obtained by solving the set of equations:

$$\begin{cases} h_0 = -1 \\ h_1 = 3. \end{cases}$$

As can be seen from the foregoing embodiments, in the embodiment of the present invention, using a fading factor after deconvolution or a fading factor obtained by solving may better restore fading on a channel, so that a process of performing interference cancellation for reconstructed data is closer to an actual sending process and closer to an originally sent signal, thereby improving cancellation efficiency, further reducing interference, improving a signal-to-interference-plus-noise ratio of a user during demodulation, and improving performance. In addition, cell capacity is improved and more users are accessed on a precondition of ensuring that user performance does not change.

Figure 5:
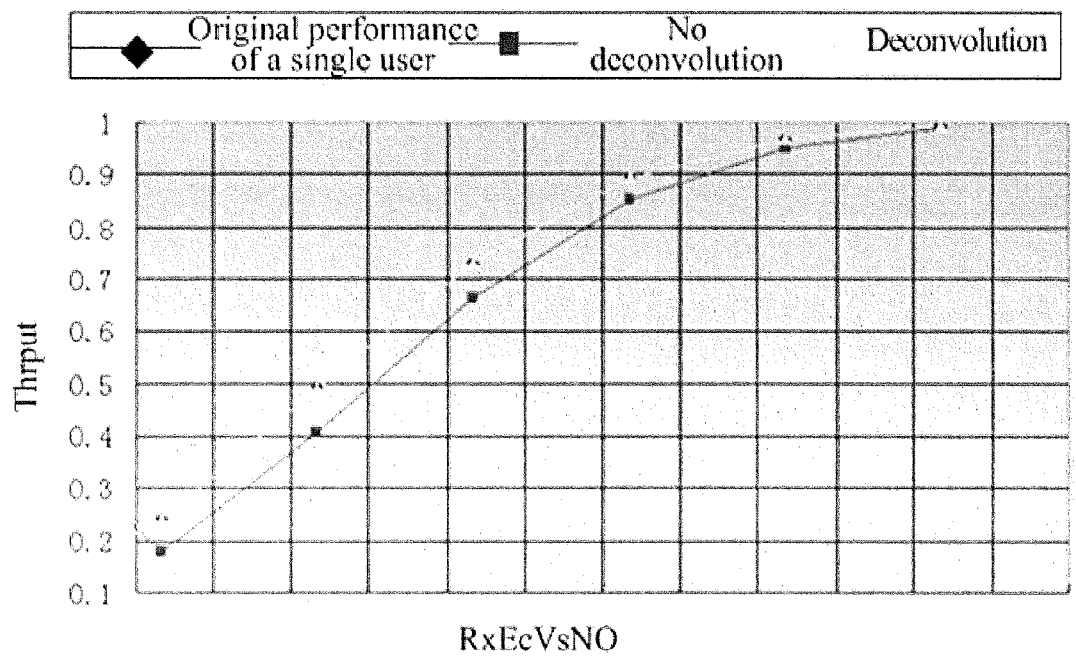
FIG. 5 is a schematic diagram of performance comparison between a case with deconvolution and a case without deconvolution according to an embodiment of the present invention.

When there is only one user, in interference cancellation, a fading factor processed by deconvolution is used to reconstruct data, and then the data is demodulated, and performance obtained thereafter is consistent with performance without interference cancellation; and it is ensured that a gain of the interference cancellation is not affected by estimation accuracy. FIG. 5 shows a schematic diagram of performance comparison between a case with deconvolution and a case without deconvolution.

As shown in FIG. 5, performance of interference cancellation by using a channel fading factor without deconvolution is even worse than original performance of a single user; whereas performance of interference cancellation by using a channel fading factor with deconvolution is almost the same as the original performance of a single user.

Figure 6:
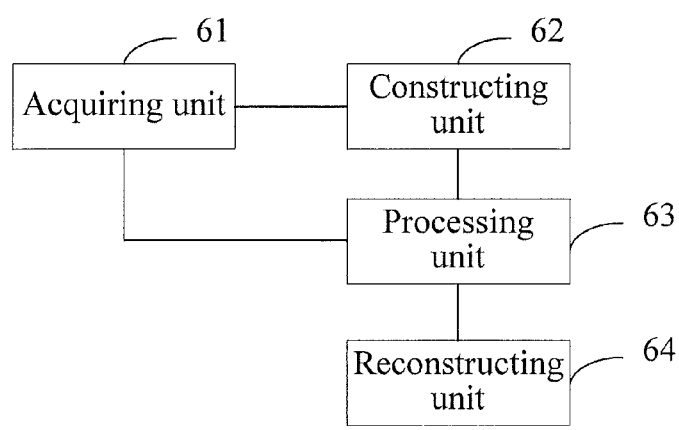
FIG. 6 is a schematic structural diagram of an apparatus for reconstructing data according to an embodiment of the present invention.

Based on the process of the foregoing embodiments, an embodiment of the present invention further provides an apparatus for reconstructing data. Refer to FIG. 6 for details of a schematic diagram of the apparatus. The apparatus includes: an acquiring unit 61, a constructing unit 62, a processing unit 63, and a reconstructing unit 64.

The acquiring unit 61 is configured to acquire a self-correlation function of a root raised cosine filter coefficient and a fading factor of each antenna of channel estimation.

In this embodiment, a root raised cosine filter at a receive end is preset, that is, once the root raised cosine filter at the receive end is determined, a self-correlation function of the root raised cosine filter at the receive end is determined, and therefore $R_p$ is determined. For acquiring the fading factor of each antenna of channel estimation, in this embodiment, a pilot is used by the receive end to perform channel estimation and obtain an estimated fading factor of each antenna, and the channel fading factors obtained by the channel estimation reflect channel information (including an amplitude and a phase). For a person skilled in the art, this process is already a well-known technology, and therefore no further details are provided herein.

The constructing unit 62 is configured to construct an L-dimension matrix of the self-correlation function according to an antenna, where L is the number of valid paths found by a single antenna. Using FIG. 3 as an example, there are five valid paths for an antenna i, that is, Ni=L=5. It is known that a location of a valid path found by the antenna i is tmpFD[Index[i]], and Ni represents the number of valid paths of the antenna i. $R_{pp}$ is constructed. For an antenna, the matrix is a matrix of at most N*N, where N is the maximum number of paths.

The processing unit 63 is configured to process a result of superposing the L-dimension matrix of the self-correlation function constructed by the constructing unit 62 and the fading factor of each antenna acquired by the acquiring unit 61 to obtain an estimate value of an actual fading factor of each antenna.

The reconstructing unit 64 is configured to reconstruct (that is, add fading to) received data according to the estimate values of the actual fading factors obtained by the processing unit 63 to obtain reconstructed data used for cancellation.

The reconstructed data is used for interference cancellation, and the reconstructing data is adding fading to the received data.

In this embodiment, the processing unit 63 includes: a solving processing unit, configured to perform a solving operation on the result of superposing the L-dimension matrix of the self-correlation function constructed by the constructing unit 62 and the fading factor of each antenna acquired by the acquiring unit 61 to obtain the estimate value of the actual fading factor of each antenna. The solving operation may be performed according to a method of solving a set of linear equations to obtain the estimate value of the actual fading factor of each antenna.

Preferably, the processing unit 63 may include: an inverting unit and a deconvolution processing unit.

The inverting unit is connected to the constructing unit 62, and is configured to perform inversion on the L-dimension matrix of the self-correlation function constructed by the constructing unit 62 to obtain an L-dimension inverse matrix of the self-correlation function; and may specifically perform inversion on the L-dimension matrix of the self-correlation function according to a successive over relaxation method SOR or a decomposition method, which is not limited herein.

The deconvolution processing unit is configured to perform deconvolution processing on the result of superposing the fading factor of each antenna acquired by the acquiring unit 61 and the L-dimension inverse matrix of the self-correlation function obtained by the inverting unit to obtain the estimate value of the actual fading factor of each antenna. In this step, a formula $$h_j = \sum_{l=0}^{L-1} h'_l R_{pp}^{-1}(j, l)$$

may be used to derive an actual fading factor of the antenna i after deconvolution processing is performed, that is, the estimated actual fading factor $h_j$.

Preferably, based on all the foregoing embodiments, the apparatus may further include: a location ordering unit, connected to the acquiring unit 61 and configured to reorder locations of paths and locations of fading factors according to an antenna number, so that the paths and the fading factors are separately arranged according to different antennas. This is specifically as shown in FIG. 3, and no further details are provided herein.

Preferably, the apparatus may be a receiver, or may be integrated into a receiver, or may be independently deployed, and this is not limited in this embodiment.

For an implementation process of functions and roles of each unit of the apparatus, refer to the corresponding implementation process in the foregoing methods, and no further details are provided herein.

It should be further noted that in this specification, the terms "include", "comprise", or any variation thereof are intended to cover a non-exclusive inclusion, therefore, enabling a process, a method, an article, or a device, which includes a series of elements, to include not only such elements, but also other elements that are not specifically listed, or inherent elements of the process, the method, the article, or the device. If no more limitations are made, an element limited by the term "include a/an . . . " does not exclude that there are other same elements existing in the process, the method, the article, or the device, which includes the element.

According to the description of the foregoing embodiments, a person skilled in the art may clearly understand that the present invention may be implemented by software in addition to a necessary universal hardware platform, or by hardware, of course. However, in most circumstances, the former is a better implementation manner. Based on such an understanding, the technical solutions in the present invention, essentially, or the part contributing to the prior art, may be implemented in a form of a software product. The computer software product may be stored in a storage medium, such as a ROM/RAM, a magnetic disk, or an optical disc, and includes several instructions for instructing a computer device (which may be a personal computer, a server, or a network device) to perform the methods described in each embodiment or some part of the embodiments of the present invention.

The foregoing descriptions are merely exemplary embodiments of the present invention. It should be pointed out that a person of ordinary skill in the art may make several improvements and modifications without departing from the principle of the present invention, and these improvements and modifications shall fall within the protection scope of the present invention.

What is claimed is:

1. A method for reconstructing data, comprising:
   acquiring, by a receive end, a self-correlation function of a root raised cosine filter coefficient and a fading factor of each antenna of channel estimation;
   constructing, by the receive end, an L-dimension matrix of the self-correlation function according to the antenna, where L is the number of valid paths found by said each antenna;
   processing, by the receive end, a result of superposing the L-dimension matrix of the self-correlation function and the fading factor of each antenna to obtain an estimate value of an actual fading factor of the each antenna; and
   reconstructing, by the receive end, received data according to the estimate value of the actual fading factor to obtain reconstructed data used for interference cancellation;
   wherein the processing the result of superposing the L-dimension matrix of the self-correlation function and the fading factor of each antenna to obtain an estimate value of an actual fading factor of the each antenna comprises:
   performing a solving operation on the result of superposing the L-dimension matrix of the self-correlation function and the fading factor of each antenna to obtain the estimate value of the actual fading factor of the each antenna;
   performing inversion on the L-dimension matrix of the self-correlation function to obtain an L-dimension inverse matrix of the self-correlation function; and
   performing deconvolution processing on the result of superposing the fading factor of each antenna and the L-dimension inverse matrix of the self-correlation function to obtain the estimate value of the actual fading factor of the each antenna.

2. The method according to claim 1, wherein the performing the solving operation on the result of superposing the L-dimension matrix of the self-correlation function and the fading factor of each antenna to obtain the estimate value of the actual fading factor of the each antenna comprises:
   performing the solving operation on the result of superposing the L-dimension matrix of the self-correlation function and the fading factor of each antenna according to a method of solving a set of linear equations to obtain the estimate value of the actual fading factor of the each antenna.

3. The method according to claim 1, wherein the performing inversion on the L-dimension matrix of the self-correlation function comprises: performing the inversion on the L-dimension matrix of the self-correlation function according to a successive over relaxation method (SOR) or a decomposition method.

4. The method according to claim 3, wherein the reconstructing received data according to the estimate values of the actual fading factors to obtain actual sent data comprises:
   adding fading to the received data according to the estimate values of the actual fading factors to obtain the actual sent data.

5. The method according to claim 4, wherein the method further comprises:
   reordering locations of the L paths and locations of fading factors according to an antenna number, so that the paths and the fading factors are separately arranged according to different antennas.

6. An apparatus for reconstructing data, comprising:
   a processor;
   and a computer-readable storage medium storing a program to be executed by the processor, the program including instructions for:
   acquiring a self-correlation function of a root raised cosine filter coefficient and a fading factor of each antenna of channel estimation;
   constructing an L-dimension matrix of the self-correlation function according to the antenna, wherein L is the number of valid paths found by said each antenna;
   processing a result of superposing the L-dimension matrix of the self-correlation function constructed by the constructing unit and the fading factor of each antenna acquired by the acquiring unit to obtain an estimate value of an actual fading factor of the each antenna; and
   reconstructing received data according to the estimate value of the actual fading factor obtained by the processing unit to obtain reconstructed data used for interference cancellation;
   wherein the processor
   is configured to perform a solving operation on the result of superposing the L-dimension matrix of the self-correlation function constructed by the constructing unit and the fading factor of each antenna acquired by the acquiring unit to obtain the estimate value of the actual fading factor of the each antenna;
   is configured to perform inversion on the L-dimension matrix of the self-correlation function to obtain an L-dimension inverse matrix of the self-correlation function; and
   is configured to perform deconvolution processing on the result of superposing the fading factor of each antenna acquired by the acquiring unit and the L-dimension inverse matrix of the self-correlation function obtained by the inverting unit to obtain the estimate value of the actual fading factor of the each antenna.

7. The apparatus according to claim 6, wherein the processor is configured to perform a solving operation on the result of superposing the L-dimension matrix of the self-correlation function and the fading factor of each antenna according to a method of solving a set of linear equations to obtain the estimate value of the actual fading factor of the each antenna.

8. The apparatus according to claim 6, wherein the processor is configured to perform inversion on the L-dimension matrix of the self-correlation function according to a successive over relaxation method (SOR) or a decomposition method to obtain the L-dimension inverse matrix of the self-correlation function.

9. The apparatus according to claim 8, wherein the processor is configured to add fading to the received data according to the estimate values of the actual fading factors obtained by the processing unit to obtain the reconstructed data used for cancellation.

10. The apparatus according to claim 9, wherein the processor:
    is configured to reorder locations of paths and locations of fading factors according to an antenna number, so that the paths and the fading factors are separately arranged according to different antennas.

11. The apparatus according to claim 9, wherein the apparatus is a receiver or integrated into a receiver.

* * * * *